United States Patent
Fujita et al.

(10) Patent No.: US 10,858,036 B2
(45) Date of Patent: Dec. 8, 2020

(54) STEERING SYSTEM

(71) Applicant: JTEKT CORPORATION, Osaka (JP)

(72) Inventors: Tetsuya Fujita, Yamatotakada (JP); Shin Yano, Kawagoe (JP)

(73) Assignee: JTEKT CORPORATION, Osaka (JP)

( * ) Notice: Subject to any disclaimer, the term of this patent is extended or adjusted under 35 U.S.C. 154(b) by 157 days.

(21) Appl. No.: 16/214,394

(22) Filed: Dec. 10, 2018

(65) Prior Publication Data
US 2019/0185047 A1 Jun. 20, 2019

(30) Foreign Application Priority Data
Dec. 15, 2017 (JP) ................. 2017-240565

(51) Int. Cl.
| | |
|---|---|
| *B62D 5/04* | (2006.01) |
| *B62D 6/10* | (2006.01) |
| *B62D 1/20* | (2006.01) |
| *B62D 3/12* | (2006.01) |

(52) U.S. Cl.
CPC ............. *B62D 5/0403* (2013.01); *B62D 1/20* (2013.01); *B62D 3/12* (2013.01); *B62D 5/0406* (2013.01); *B62D 5/0421* (2013.01); *B62D 6/10* (2013.01)

(58) Field of Classification Search
CPC .. B62D 5/0406; B62D 5/0403; B62D 5/0409; B62D 3/126
See application file for complete search history.

(56) References Cited

U.S. PATENT DOCUMENTS

| | | | | | |
|---|---|---|---|---|---|
| 5,899,294 | A | * | 5/1999 | Shimizu | B62D 5/043 |
| | | | | | 180/444 |
| 10,370,028 | B2 | * | 8/2019 | Matsumura | B62D 5/0472 |
| 10,746,280 | B2 | * | 8/2020 | Kamaguchi | B62D 6/10 |
| 2016/0207565 | A1 | * | 7/2016 | Maier | B62D 3/126 |
| 2019/0308660 | A1 | * | 10/2019 | Yoda | B62D 5/062 |

FOREIGN PATENT DOCUMENTS

| | | | |
|---|---|---|---|
| CA | 2619580 A1 | 8/2009 | |
| JP | H06-61653 U | 8/1994 | |
| JP | 2017-136955 A | 8/2017 | |
| WO | WO-2014077006 A1 * | 5/2014 | ........... B62D 5/0409 |

OTHER PUBLICATIONS

May 15, 2019 Search Report issued in European Patent Application No. 18211957.8.

* cited by examiner

*Primary Examiner* — Nicole T Verley
(74) *Attorney, Agent, or Firm* — Oliff PLC (57) ABSTRACT

A steering system includes a pinion shaft that meshes with a rack shaft, an input shaft, a torsion bar that couples the input shaft and the pinion shaft together, a fixing pin that fixes the torsion bar to the input shaft, a housing having a first housing portion that houses a part of the input shaft, and a cover member having a cylindrical portion externally fitted to the input shaft protruding from the first housing portion, and a disc portion that covers an end face of the first housing portion. A through hole where the fixing pin is inserted is formed in the input shaft. On the cylindrical portion of the cover member, a plurality of annular lips are provided, except for a portion that faces each of openings of the through hole, on one side and the other side in an axial direction with respect to the portion.

5 Claims, 7 Drawing Sheets

COMPARATIVE EXAMPLE

FIG.7

STEERING SYSTEM

INCORPORATION BY REFERENCE

The disclosure of Japanese Patent Application No. 2017-240565 filed on Dec. 15, 2017 including the specification, drawings and abstract, is incorporated herein by reference in its entirety.

BACKGROUND OF THE INVENTION

1. Field of the Invention

The present invention relates to a steering system for a vehicle.

2. Description of the Related Art

Hitherto, in a rack and pinion type steering system, rotation of a steering wheel is transmitted to a pinion shaft via a steering shaft, and a rack shaft moves in a vehicle width direction through meshing between the pinion shaft and the rack shaft, thereby turning front wheels that are steered wheels. In such a steering system, there is an electric power steering system in which a steering torque is detected based on a torsion amount of a torsion bar (torsion shaft) that is twisted by a torque transmitted to a pinion shaft and a steering assist force is generated by an electric motor based on the detected steering torque (see, for example, Japanese Utility Model Application Publication No. 6-61653 (JP 6-61653 U)).

In the steering system (electric power steering system) described in JP 6-61653 U, an input shaft and an output shaft are coupled together by a torsion bar. The steering torque is input to the input shaft. The output shaft has a pinion that meshes with a rack shaft. The input shaft is a hollow shaft having a hollow in an axis center portion in a range from the lower end to the vicinity of the upper end. One end of the torsion bar is housed in the hollow. The torsion bar is fixed to the input shaft by driving a pin into a through hole extending through the ends of the input shaft and the torsion bar in a radial direction. A torque sensor is arranged on the outer periphery of the torsion bar. The torque sensor magnetically detects the torsion amount of the torsion bar as the steering torque. The torque sensor is housed in a sensor housing.

The torsion bar is fixed to the input shaft with the pin after zero adjustment of the torque sensor is performed by adjusting the rotational position of the input shaft from the outside of the sensor housing. Due to this necessity, the through hole where the pin is driven is provided at a part protruding upward from the upper opening of the sensor housing. In order to prevent entry of water or the like from the through hole, a dust cover serving as a cover member attached to the input shaft covers the opening of the through hole. The dust cover is formed of rubber, and integrally has a cylindrical portion and a disc-shaped umbrella portion. The cylindrical portion has an inner peripheral surface brought into tight contact with the outer peripheral surface of the input shaft. The umbrella portion covers the upper opening of the sensor housing to suppress entry of foreign objects into the sensor housing.

In order to increase the detection accuracy of the steering torque, it is desirable to increase the torsion amount by increasing the length of the torsion bar. In this case, the distance between the through hole where the pin is driven and the upper opening of the sensor housing increases, thereby requiring that the length of the cylindrical portion of the dust cover be increased. When the length of the cylindrical portion of the dust cover is increased, however, the cylindrical portion is likely to buckle due to a frictional resistance generated between the inner peripheral surface of the dust cover and the outer peripheral surface of the input shaft when the dust cover is attached to the input shaft by press fitting. Thus, it may be difficult to attach the dust cover to the input shaft. If the frictional resistance to be generated when the dust cover is attached is reduced by simply reducing an interference of the dust cover with the input shaft, there is a possibility that the waterproof property cannot be obtained sufficiently.

SUMMARY OF THE INVENTION

It is one object of the present invention to provide a steering system in which a cylindrical portion of a cover member is less likely to buckle when the cover member is attached to an input shaft even if the length of the cylindrical portion of the cover member to be attached to the input shaft is increased.

One aspect of the present invention relates to a steering system including a steering operation shaft, a pinion shaft, an input shaft, a torsion shaft, a fixing pin, a housing, and a cover member. The steering operation shaft has rack teeth and is configured to turn a steered wheel of a vehicle by moving in an axial direction of the steering operation shaft. The pinion shaft has pinion teeth at its one end. The pinion teeth mesh with the rack teeth. The input shaft is configured to rotate in response to a steering operation of a steering wheel. The torsion shaft couples the input shaft and the pinion shaft together and is twisted by a steering torque of the steering wheel. The fixing pin fixes one end of the torsion shaft to the input shaft so that the torsion shaft is not rotatable relative to the input shaft. The housing has a first housing portion and a second housing portion. The first housing portion houses the pinion shaft together with parts of the input shaft and the torsion shaft. The second housing portion houses the steering operation shaft. The cover member has a cylindrical portion and a disc portion. The cylindrical portion is externally fitted to the input shaft protruding from the first housing portion. The disc portion covers an open end face of the first housing portion.

The torsion shaft is fixed to the input shaft so as not to be rotatable relative to the input shaft by fitting the one end of the torsion shaft to a fitting hole formed in the input shaft and inserting the fixing pin into a through hole formed in each of the input shaft and the torsion shaft. The through hole of the input shaft is open in an outer peripheral surface covered with the cylindrical portion of the cover member. A plurality of annular lips are provided on an inner peripheral surface of the cylindrical portion of the cover member. The plurality of annular lips extend in a circumferential direction while ridges of the annular lips are brought into elastic contact with the outer peripheral surface of the input shaft. The plurality of annular lips are provided, except for a portion that faces each of openings of the through hole of the input shaft, on one side and the other side in an axial direction of the input shaft with respect to the portion that faces each of the openings of the through hole of the input shaft.

According to the steering system of the present invention, the cylindrical portion of the cover member can be made less likely to buckle when the cover member is attached to the input shaft even if the length of the cylindrical portion of the cover member to be attached to the input shaft is increased.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
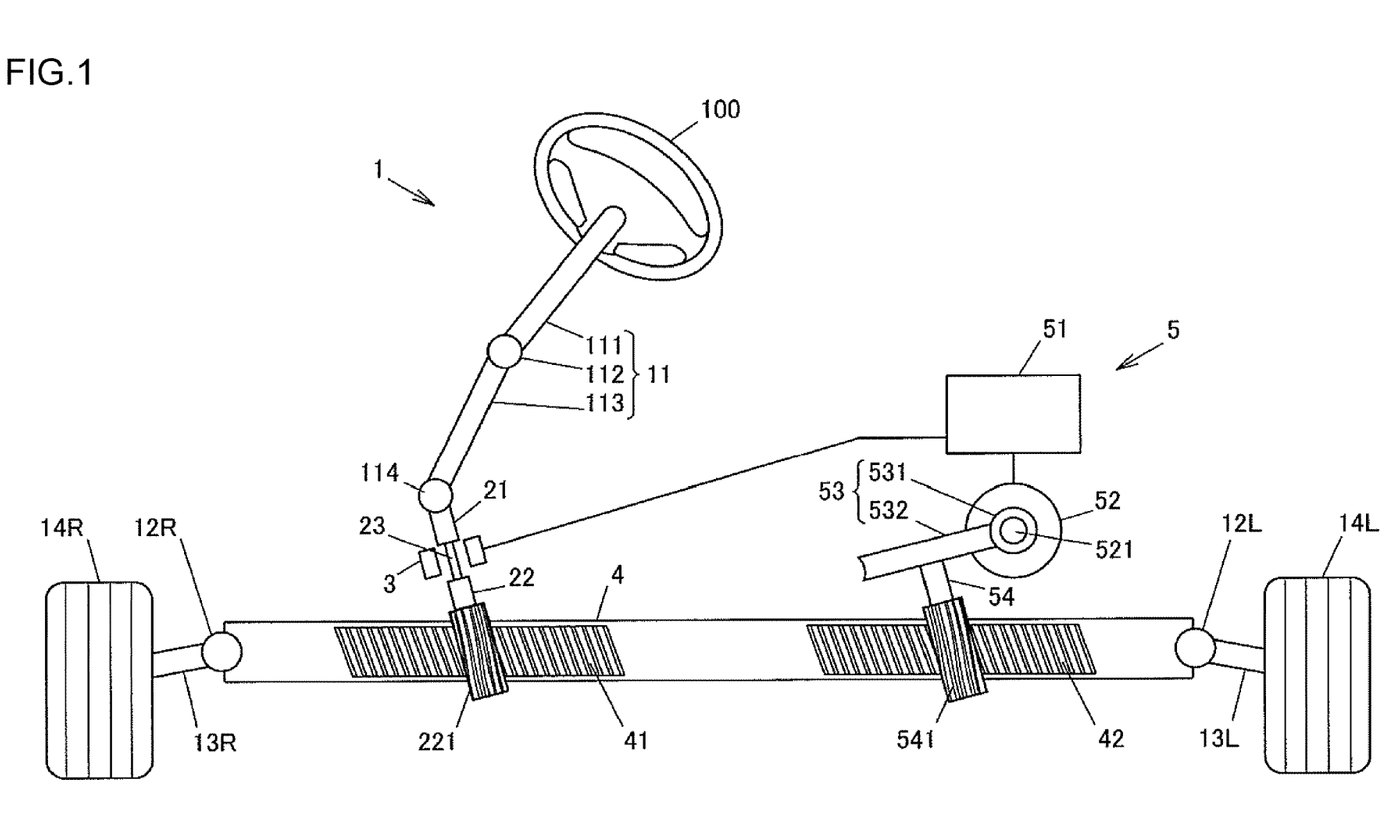
FIG. 1 is an overall structural view of a steering system according to a first embodiment of the present invention.
Figure 2:
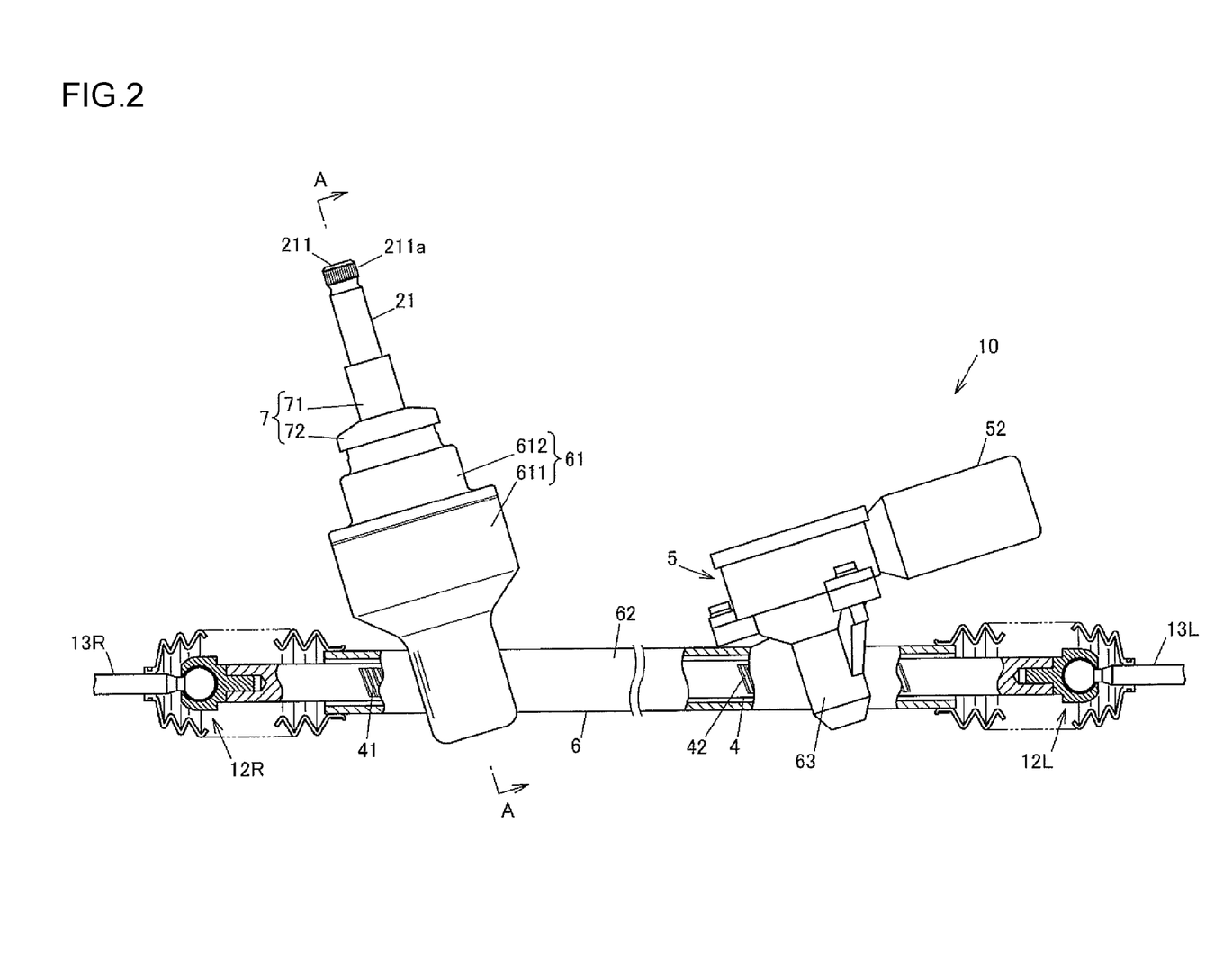
FIG. 2 is an outline drawing of components of the steering system in a partially cutaway view.
Figure 3:
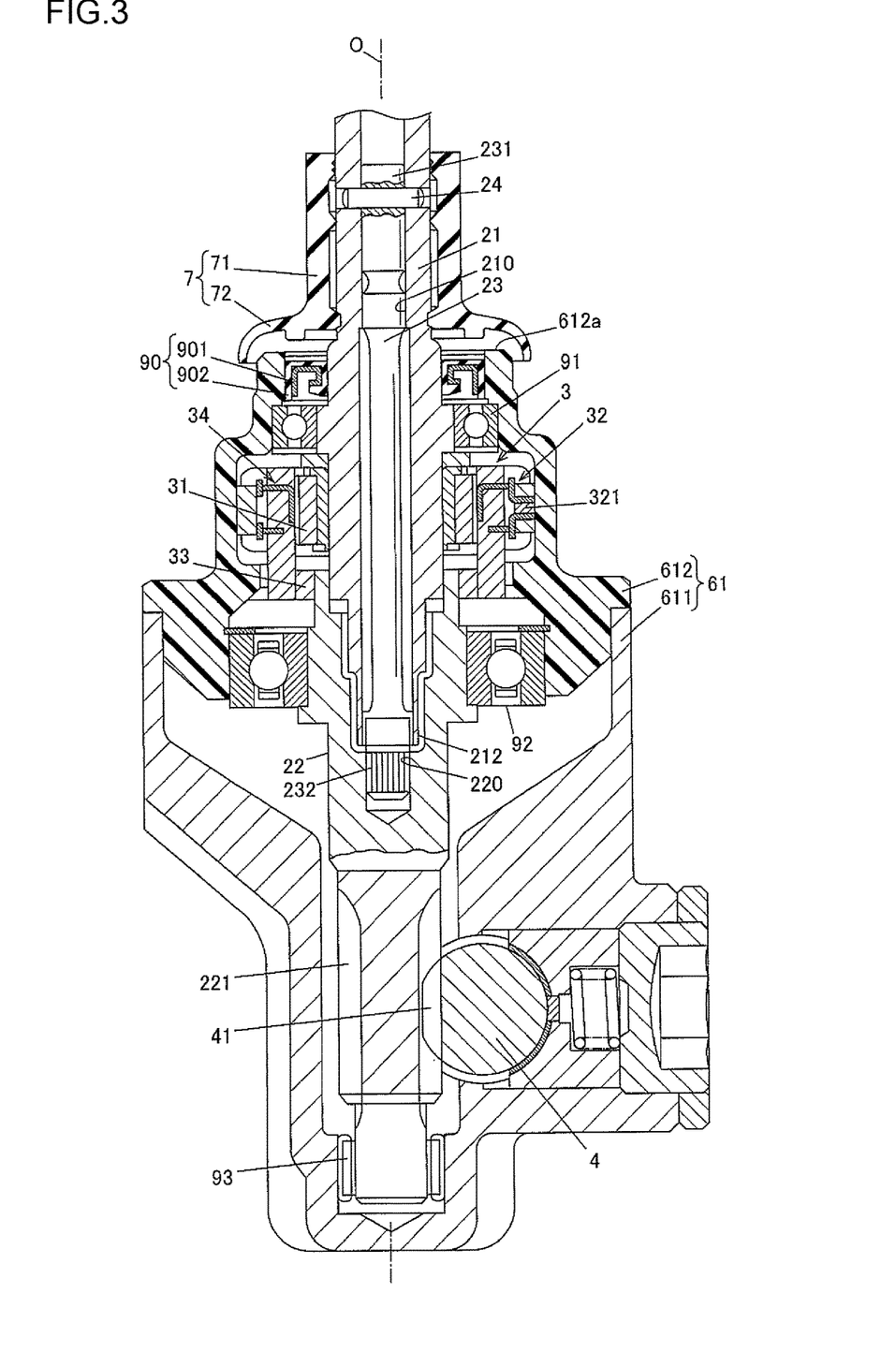
FIG. 3 is a sectional view taken along a line A-A of FIG. 2.

A first embodiment of the present invention is described below with reference to FIG. 1 to FIG. 5. FIG. 1 is an overall structural view schematically illustrating a rack and pinion type steering system according to the first embodiment of the present invention. FIG. 2 is an outline drawing of components of the steering system in a partially cutaway view. FIG. 3 is a sectional view taken along a line A-A of FIG. 2. A steering system 1 is mounted on a vehicle to turn front wheels 14R and 14L that are steered wheels in response to a driver's steering operation.

FIG. 1 and FIG. 2 illustrate a state in which the steering system is viewed from the front of the vehicle. The left side of the drawing sheet corresponds to a right side of the vehicle. The right side of the drawing sheet corresponds to a left side of the vehicle. In FIG. 1, a character "R" in reference symbols represents the right side of the vehicle, and a character "L" in reference symbols represents the left side of the vehicle. In the following description, "upper", "lower", "right", and "left" refer to directions of a vertical direction and a lateral direction of the vehicle in a state in which the steering system 1 is mounted on the vehicle.

As illustrated in FIG. 1, the steering system 1 includes a steering shaft 11, an input shaft 21, a pinion shaft 22, a torsion bar 23, a torque sensor 3, a rack shaft 4, a steering assist apparatus 5, a housing 6 (illustrated in FIG. 2), and a cover member 7 (illustrated in FIG. 2). A steering wheel 100 to be steered by a driver is fixed to one end of the steering shaft 11. A steering torque is transmitted to the input shaft 21 via the steering shaft 11. The pinion shaft 22 has pinion teeth 221. The torsion bar 23 serves as a torsion shaft that couples the input shaft 21 and the pinion shaft 22 together. The torque sensor 3 magnetically detects a torsion amount of the torsion bar as the steering torque. The rack shaft 4 serves as a steering operation shaft configured to reciprocally move in a vehicle width direction by meshing with the pinion teeth 221 of the pinion shaft 22. The steering assist apparatus 5 applies a steering assist force to the rack shaft 4 based on the steering torque detected by the torque sensor 3.

The input shaft 21, the pinion shaft 22, the torsion bar 23, the rack shaft 4, the housing 6, and the cover member 7 constitute a steering gear 10. The steering shaft 11 has a column shaft 111 and an intermediate shaft 113. The steering wheel 100 is fixed to one end of the column shaft 111. The intermediate shaft 113 is coupled to the other end of the column shaft 111 via a universal joint 112. The input shaft 21 is coupled to the intermediate shaft 113 via a universal joint 114, and rotates in response to a steering operation of the steering wheel 100. The torsion bar 23 is twisted based on the steering torque of the steering wheel 100. The torsion amount of the torsion bar 23 increases as the steering torque increases.

The steering assist apparatus 5 includes a controller 51, an electric motor 52, a speed reducing mechanism 53, and a pinion shaft 54. The controller 51 is capable of acquiring a detection signal from the torque sensor 3. The electric motor 52 generates the steering assist force by a motor current output from the controller 51. The speed reducing mechanism 53 reduces the speed of rotation of an output shaft 521 of the electric motor 52. The pinion shaft 54 is rotated by a torque of the electric motor 52 that is obtained through the speed reduction performed by the speed reducing mechanism 53. The speed reducing mechanism 53 is constituted by a worm gear 531 and a worm wheel 532. The worm gear 531 is coupled to the output shaft 521 of the electric motor 52 so as to rotate together with the output shaft 521. The worm wheel 532 meshes with the worm gear 531. The worm wheel 532 rotates together with the pinion shaft 54.

Right and left tie rods 13R and 13L are coupled to both ends of the rack shaft 4 via ball joints 12R and 12L, respectively. The right and left tie rods 13R and 13L are coupled to the right and left front wheels 14R and 14L, respectively. When the rack shaft 4 reciprocally moves in the vehicle width direction (lateral direction), the right and left tie rods 13R and 13L pivot relative to the rack shaft 4 to turn the right and left front wheels 14R and 14L, respectively.

The rack shaft 4 has first and second rack teeth 41 and 42. The pinion teeth 221 of the pinion shaft 22 mesh with the first rack teeth 41 of the rack shaft 4. The pinion shaft 54 of the steering assist apparatus 5 has pinion teeth 541. The pinion teeth 541 mesh with the second rack teeth 42 of the rack shaft 4. The rack shaft 4 moves in an axial direction along the vehicle width direction through the meshing with both the pinion teeth 221 and 541. The front wheels 14R and 14L are turned through the axial movement.

The housing 6 has a first housing portion 61, a second housing portion 62, and a third housing portion 63. The first housing portion 61 houses the pinion shaft 22 and the torque sensor 3 together with parts of the input shaft 21 and the torsion bar 23. The second housing portion 62 extends in the vehicle width direction, and houses the rack shaft 4. The third housing portion 63 houses the pinion shaft 54 together with the speed reducing mechanism 53. The first housing portion 61 is constituted by a tubular portion 611 and a sensor case 612. The tubular portion 611 houses the pinion shaft 22. The sensor case 612 is fixed to the tubular portion 611 by fitting, and houses the torque sensor 3. The tubular portion 611 is molded integrally with the second housing portion 62 and the third housing portion 63 by, for example, aluminum die casting.

For example, the sensor case 612 is formed of a thermoplastic resin obtained by adding glass fiber to polypropylene in order to improve rigidity, and is formed by injection molding. A seal ring 90 having a metal core 901 and a sealer 902 is housed in the upper end of the sensor case 612, thereby preventing entry of foreign objects into the sensor case 612 in cooperation with the cover member 7.

The input shaft 21 is inserted through the sensor case 612, and its upper end 211 (illustrated in FIG. 2) protrudes upward from the sensor case 612. The cover member 7 is press-fitted to the outer periphery of the input shaft 21 protruding from the sensor case 612, and is arranged so as to cover a part of the sensor case 612 from which the input shaft 21 extends to the outside (upper end of the sensor case 612). Serrations 211a are formed at the upper end 211 of the input shaft 21. The serrations 211a are coupled to the universal joint 114.

A fitting hole 210 is formed in the input shaft 21. The fitting hole 210 is open at a lower end 212 of the input shaft 21, and extends toward the upper end 211. An upper end 231 of the torsion bar 23 is fitted to the fitting hole 210. The upper end 231 of the torsion bar 23 is fixed to the input shaft 21 with a columnar fixing pin 24 so that the torsion bar 23 is not rotatable relative to the input shaft 21. A lower end 232 of the torsion bar 23 is coupled to the pinion shaft 22 by being, for example, spline-fitted to a fitting hole 220 formed in the pinion shaft 22 so that the torsion bar 23 is not rotatable relative to the pinion shaft 22.

The torsion bar 23 has elasticity such that the torsion bar 23 transmits the steering torque from the input shaft 21 to the pinion shaft 22 and is twisted by the steering torque. For example, the input shaft 21 and the pinion shaft 22 are formed of an iron-based metal such as carbon steel. For example, the torsion bar 23 is formed of spring steel. The input shaft 21 and the pinion shaft 22 rotate about a rotation axis O along with rotation of the steering wheel 100. In the following description, the axial direction is a direction parallel to the rotation axis O.

The torque sensor 3 includes a ring magnet 31, a magnetic flux collecting ring assembly 32, and a magnetic yoke assembly 34. The ring magnet 31 has a plurality of magnetic poles, and is fixed to the input shaft 21. The magnetic flux collecting ring assembly 32 is fixed to the sensor case 612. The magnetic yoke assembly 34 is fixed to the pinion shaft 22 with an annular collar 33. The magnetic flux collecting ring assembly 32 has a magnetic field detection element 321.

When the torsion bar 23 is twisted by the steering torque, the ring magnet 31 and the magnetic yoke assembly 34 rotate relative to each other. As a result, the intensity of a magnetic field passing through the magnetic flux collecting ring assembly 32 changes. The magnetic field detection element 321 detects the change in the intensity of the magnetic field, thereby detecting the steering torque. The structure of the torque sensor 3 is described above as an example, but is not limited to this example. Various structures may be used as the structure of the torque sensor 3. The detection signal from the torque sensor 3 is output to the controller 51.

Inside the sensor case 612, a first bearing 91 and a second bearing 92 are arranged at positions between which the torque sensor 3 is interposed in the vertical direction. The first bearing 91 is arranged above the torque sensor 3, and rotatably supports the input shaft 21. The second bearing 92 is arranged below the torque sensor 3, and rotatably supports the pinion shaft 22 in cooperation with a third bearing 93 arranged at the bottom of the tubular portion 611.

Figure 4:
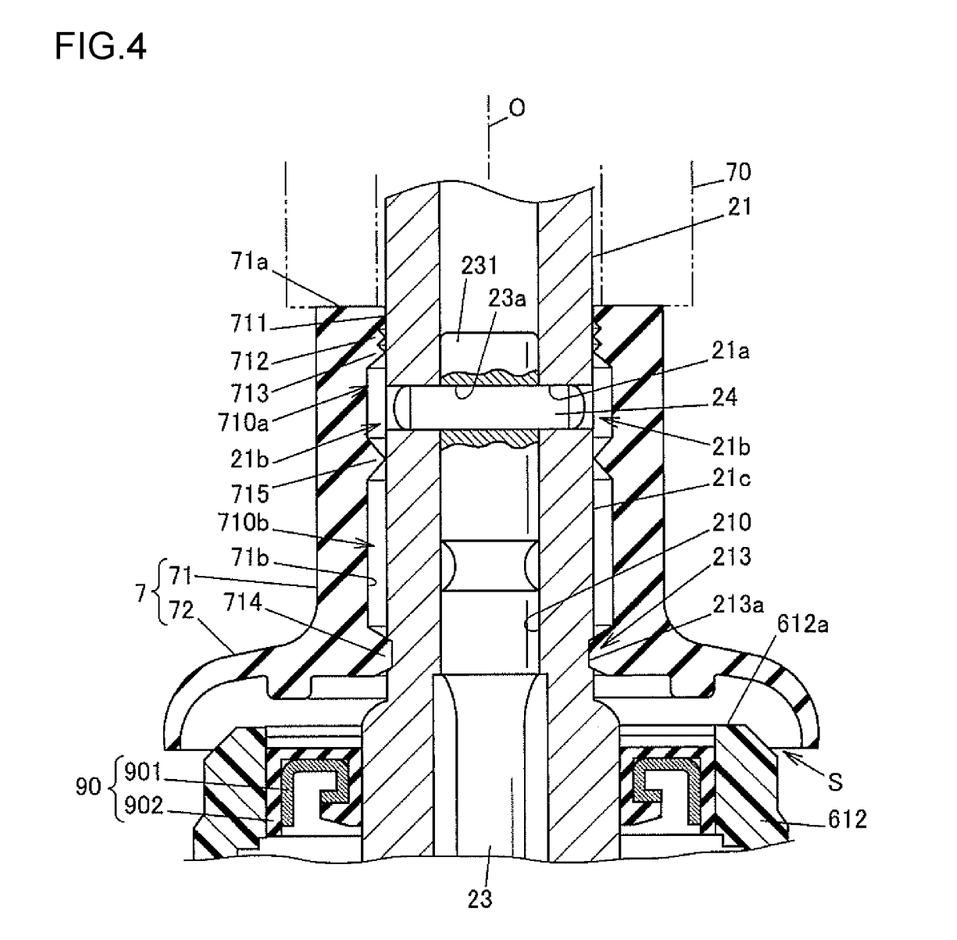
FIG. 4 is an enlarged view of the periphery of a cover member in FIG. 3.
Figure 5:
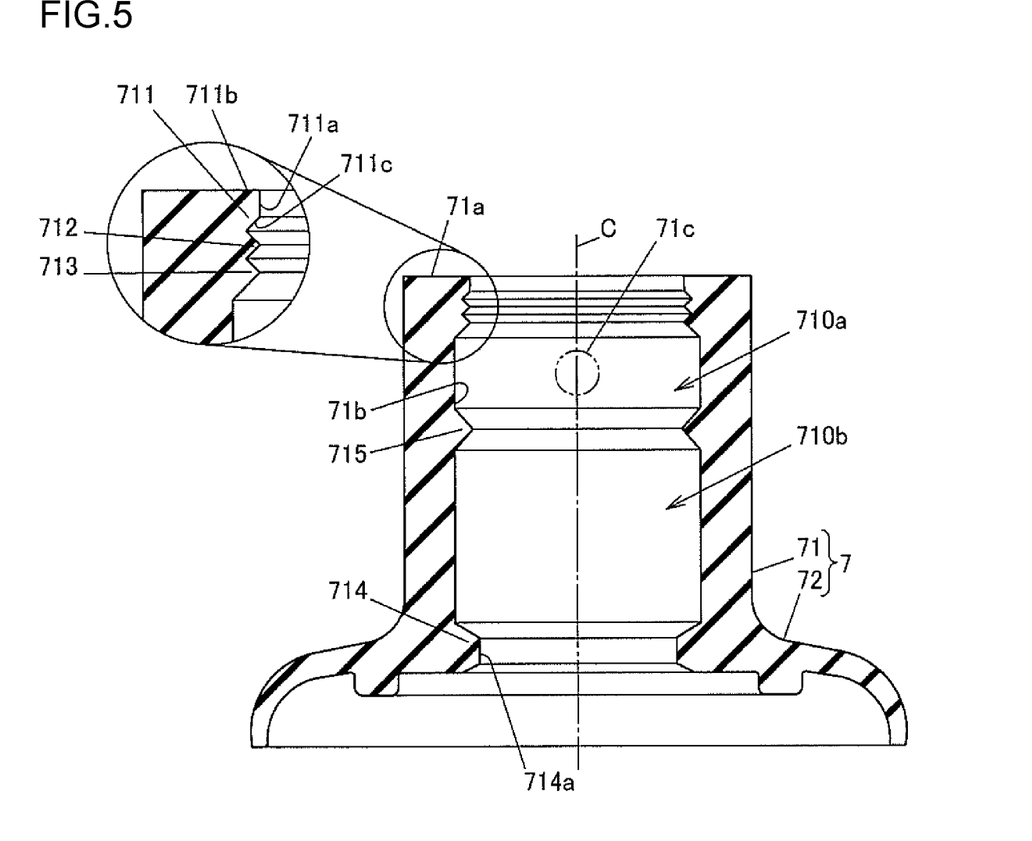
FIG. 5 is a sectional view illustrating the cover member alone.

FIG. 4 is an enlarged view of the periphery of the cover member 7 in FIG. 3. FIG. 5 is a sectional view illustrating the cover member 7 alone.

The fixing pin 24 is inserted, by press fitting, into a through hole 21a formed in the input shaft 21 and a through hole 23a formed in the torsion bar 23. The through hole 21a of the input shaft 21 is formed at a part protruding from an open end face 612a of the sensor case 612, and extends through the input shaft 21 in its diameter direction. The through hole 23a of the torsion bar 23 communicates with the through hole 21a of the input shaft 21, and extends through the upper end 231 of the torsion bar 23 in its diameter direction. The fixing pin 24 is inserted from one opening 21b out of openings 21b at both ends of the through hole 21a of the input shaft 21 to pass through the through hole 23a of the torsion bar 23.

The cover member 7 is a rubber member formed of, for example, chloroprene rubber (CR), and integrally has a cylindrical portion 71 and an umbrella-shaped disc portion 72. The cylindrical portion 71 is externally fitted to the input shaft 21 protruding from the sensor case 612. The disc portion 72 covers the open end face 612a of the sensor case 612. The disc portion 72 protrudes radially outward from the lower end of the cylindrical portion 71. A central axis C of the cylindrical portion 71 coincides with the rotation axis O of the input shaft 21.

The cover member 7 is fixed to the outer periphery of the input shaft 21 by press fitting, and rotates together with the input shaft 21. When the cover member 7 is press-fitted, the end face of a cylindrical jig 70 is brought into abutment against an upper end face (end face opposite to the sensor case 612) 71a of the cylindrical portion 71 to press the cover member 7 in the axial direction toward the sensor case 612. In FIG. 4, the jig 70 is indicated by imaginary outlines (long dashed double-short dashed lines).

The through hole 21a of the input shaft 21 where the fixing pin 24 is inserted has the openings 21b on an outer peripheral surface 21c of the input shaft 21 at parts covered with the cylindrical portion 71. First to fifth annular lips 711 to 715 are provided on the inner peripheral surface of the cylindrical portion 71 of the cover member 7. The first to fifth annular lips 711 to 715 extend in a circumferential direction while their ridges are brought into elastic contact with the outer peripheral surface 21c of the input shaft 21. Of the first to fifth annular lips 711 to 715, the first to third annular lips 711 to 713 are provided above the through hole 21a of the input shaft 21 so as to adjoin each other along the axial direction.

Of the first to third annular lips 711 to 713, the uppermost first annular lip 711 has a trapezoidal shape in cross section, and a distal end face 711a brought into elastic contact with the outer peripheral surface 21c of the input shaft 21 is a cylindrical face parallel to the axial direction. The second and third annular lips 712 and 713 have a triangular shape in cross section, and their ridges are brought into elastic contact with the outer peripheral surface 21c of the input shaft 21. The third annular lip 713 is provided below the second annular lip 712.

One upper face 711b out of two faces 711b and 711c of the first annular lip 711 is a part of the upper end face 71a of the cylindrical portion 71. In this embodiment, the entire upper end face 71a of the cover member 7 is a flat face perpendicular to the axial direction of the input shaft 21. The face 711b of the first annular lip 711 that corresponds to the radially inner end of the upper end face 71a has a shape that is not recessed toward the sensor case 612 with respect to the axial direction of the input shaft 21. The shape of the upper end face 71a of the cover member 7 is a non-water stagnating shape in which water does not stagnate at the radially inner end of the upper end face 71a.

The fourth annular lip 714 is provided on the inner peripheral surface of the cylindrical portion 71 at its lower end. In the input shaft 21, an annular outer peripheral groove 213 is formed at a part protruding from the open end face 612a of the sensor case 612. The distal end of the fourth annular lip 714 is fitted to the outer peripheral groove 213. A distal end face 714a of the fourth annular lip 714 is brought into elastic contact with a bottom face 213a of the outer peripheral groove 213.

The fifth annular lip 715 is provided between the third annular lip 713 and the fourth annular lip 714 so that the third annular lip 713 and the fourth annular lip 714 are spaced away from each other. A first lip-less area 710a is formed between the third annular lip 713 and the fifth annular lip 715. A lip brought into elastic contact with the outer peripheral surface 21c of the input shaft 21 is not provided in the first lip-less area 710a. Further, a second lip-less area 710b is formed between the fourth annular lip 714 and the fifth annular lip 715. A lip brought into elastic contact with the outer peripheral surface 21c of the input shaft 21 is not provided in the second lip-less area 710b.

A clearance is formed between the outer peripheral surface 21c of the input shaft 21 and an inner peripheral surface 71b of the cylindrical portion 71 in each of the first and second lip-less areas 710a and 710b. The openings 21b of the through hole 21a of the input shaft 21 face the inner peripheral surface 71b of the cylindrical portion 71 in the first lip-less area 710a. That is, the first to fifth annular lips 711 to 715 are provided, except for a portion 71c that faces each of the openings 21b of the through hole 21a of the input shaft 21, on the inner peripheral surface 71b of the cylindrical portion 71 on one side and the other side in the axial direction with respect to the portion 71c.

In FIG. 5, the portion 71c is circled by an imaginary outline (long dashed double-short dashed line). No annular lip is provided at the portion 71c based on the findings that an effect of preventing entry of water into the through hole 21a is not sufficiently exerted even if an annular lip is provided with its ridge located at the openings of the through hole 21a.

In the steering system 1 structured as described above, water splashed by the front wheels 14R and 14L while the vehicle is traveling may be scattered around the cover member 7. If the water enters the fitting hole 210 of the input shaft 21 from a clearance between the inner peripheral surface of the through hole 21a of the input shaft 21 and the outer peripheral surface of the fixing pin 24, the water may rust the input shaft 21, the pinion shaft 22, or the torsion bar 23. Depending on the amount of entry of water, the water may reach the pinion teeth 221 of the pinion shaft 22 or the first rack teeth 41 of the rack shaft 4.

In this embodiment, the first to third annular lips 711 to 713 prevent entry of water from an upper side of the cylindrical portion 71. Further, the fourth and fifth annular lips 714 and 715 prevent entry of water from a lower side of the cylindrical portion 71 via a clearance S between the disc portion 72 and the sensor case 612. If the entry of water from the lower side of the cylindrical portion 71 is prevented by the fourth annular lip 714 alone, the fifth annular lip 715 may be omitted. In this case, the first lip-less area 710a and the second lip-less area 710b correspond to one continuous lip-less area.

Figure 6:
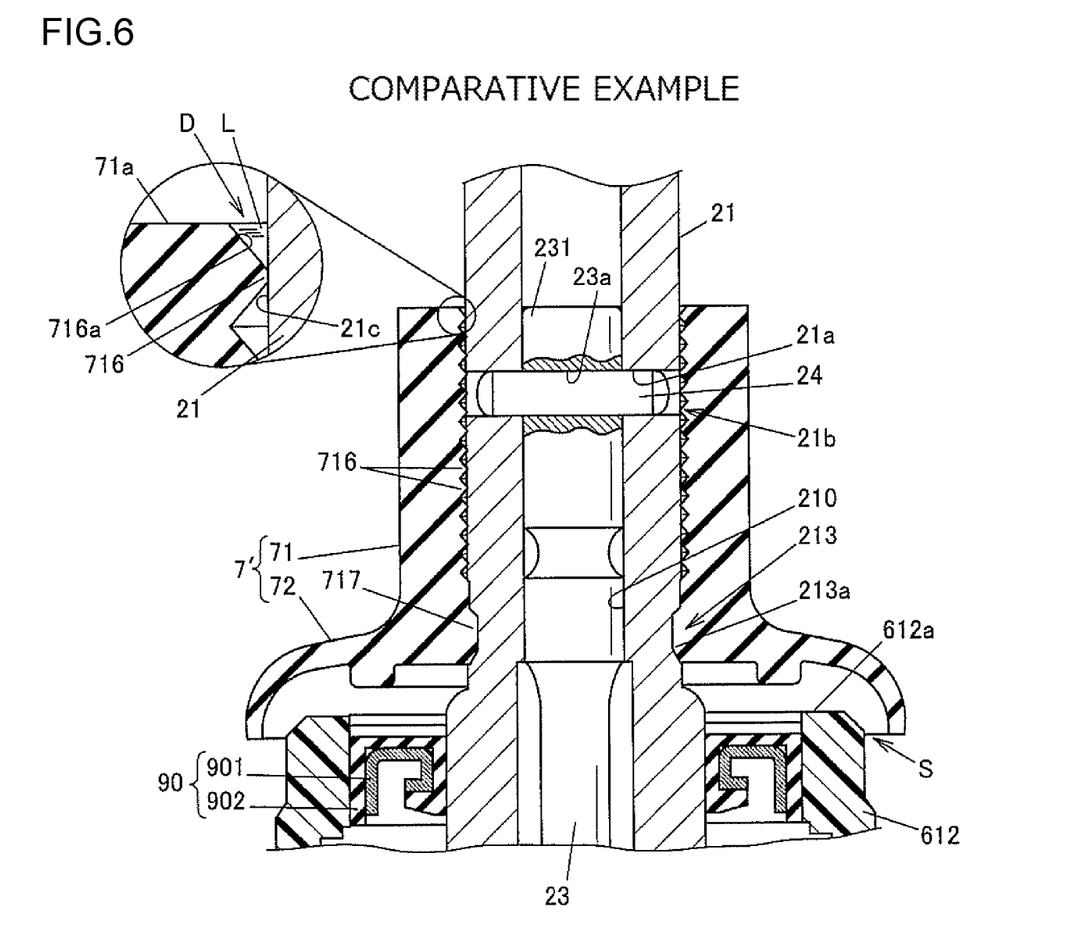
FIG. 6 is a sectional view illustrating a cover member of a comparative example together with an input shaft.

FIG. 6 is a sectional view illustrating a cover member 7' of a comparative example together with the input shaft 21 and the like. In the cover member 7', a plurality of annular lips 716 having a triangular shape in cross section are provided in a range including a portion that faces each of the openings 21b of the through hole 21a of the input shaft 21. A large number of annular lips 716 are provided above an annular lip 717 so as to adjoin each other. The annular lip 717 is fitted to the outer peripheral groove 213 of the input shaft 21.

Of the annular lips 716, an uppermost annular lip 716 is defined as a first annular lip 716. A face 716a of the first annular lip 716 is inclined more downwardly (closer to the sensor case 612) at a position closer to the radially inner distal end. Due to the face 716a, the upper end face 71a of the cover member 7' has a water stagnating shape in which water stagnates at the radially inner end of the upper end face 71a. FIG. 6 illustrates stagnating water L that stagnates in a recess D formed due to the face 716a of the first annular lip 716. The stagnating water L may rust the input shaft 21, and may also reach the openings 21b of the through hole 21a through the annular lips 716 over a long period of time.

Actions and effects of the first embodiment are described below. According to the first embodiment of the present invention, the first to fifth annular lips 711 to 715 are formed on the inner peripheral surface 71b of the cylindrical portion 71 except for the portion 71c that faces each of the openings 21b of the through hole 21a of the input shaft 21. Therefore, for example, the number of annular lips is smaller than that of the comparative example described above, thereby reducing a frictional resistance to be generated when the cover member 7 is press-fitted by the jig 70. Thus, the cylindrical portion 71 is less likely to buckle. Accordingly, the workability is improved when the cover member 7 is attached, and the manufacturing time and the manufacturing cost of the steering system 1 can be reduced.

According to the first embodiment of the present invention, the entire upper end face 71a of the cover member 7 is the flat face perpendicular to the axial direction, and has the non-water stagnating shape. Therefore, generation of the stagnating water L illustrated in FIG. 6 is suppressed, whereby the entry of water into the through hole 21a of the input shaft 21 can be prevented more securely.

Figure 7:
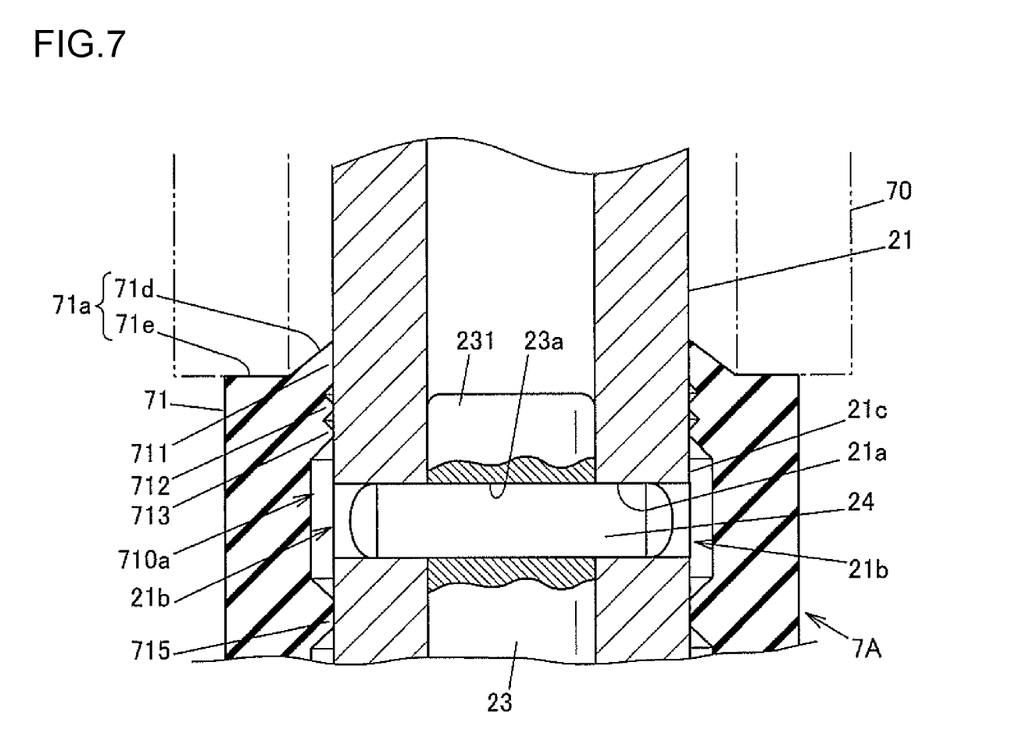
FIG. 7 is a sectional view illustrating a cover member of a second embodiment together with the input shaft.

Next, a second embodiment of the present invention is described with reference to FIG. 7. FIG. 7 is a sectional view illustrating a cover member 7A of this embodiment together with the input shaft 21. The cover member 7A differs from the cover member 7 of the first embodiment in terms of the shape of the upper end face 71a of the cylindrical portion 71. Other structures are similar to those of the cover member 7. Therefore, the names and reference symbols of the members and the like that are used in the first embodiment are also used in the second embodiment, and the difference between the second embodiment and the first embodiment is mainly described.

In this embodiment, the radially inner end of the upper end face 71a of the cylindrical portion 71 of the cover member 7A is formed by an inclined face 71d that is inclined farther away from the sensor case 612 at a position closer to the input shaft 21. The radially outer end of the upper end face 71a is formed by an annular flat face 71e perpendicular to the axial direction. That is, the upper end face 71a of the cylindrical portion 71 of the cover member 7A includes the inclined face 71d at its radially inner end and the flat face 71e at its radially outer end.

The inclined face 71d is a partially conical face protruding upward from the radially inner end of the flat face 71e. When the cover member 7A is attached to the input shaft 21, the end face of the jig 70 abuts against the flat face 71e. Thus, the pressing force of the jig 70 is appropriately transmitted to the cylindrical portion 71 along the axial direction.

According to the second embodiment described above, the radially inner end of the upper end face 71a of the cylindrical portion 71 of the cover member 7A is formed by the inclined face 71d. Therefore, water is less likely to stagnate on the upper end face 71a as compared to the first embodiment, thereby improving the waterproof property.

The radially outer end of the upper end face 71a is formed by the flat face 71e, and the jig 70 abuts against the flat face 71e. Therefore, when the cover member 7A is press-fitted, it is unlikely that the cylindrical portion 71 is deformed to buckle due to the formation of the inclined face 71d.

Although the present invention has been described above based on the embodiments, the invention of the claims is not limited to the embodiments. It should be noted that all combinations of the features described in the embodiments are not essential for the solution of the invention to the problem.

The present invention may be modified as appropriate without departing from the spirit of the present invention. For example, the embodiments described above are directed to the case where the present invention is applied to the rack assist type electric power steering system in which the speed of rotation of the output shaft 521 of the electric motor 52 is reduced and transferred by the speed reducing mechanism 53 and the obtained force is applied to the rack shaft 4 as the steering assist force. The present invention is not limited to this case. For example, the present invention may be applied to a pinion assist type electric power steering system in which the steering assist force is applied to the pinion shaft 22.

What is claimed is:

1. A steering system, comprising:
   a steering operation shaft having rack teeth and configured to turn a steered wheel of a vehicle by moving in an axial direction of the steering operation shaft;
   a pinion shaft having pinion teeth at its one end, the pinion teeth meshing with the rack teeth;
   an input shaft configured to rotate in response to a steering operation of a steering wheel;
   a torsion shaft that couples the input shaft and the pinion shaft together and is twisted by a steering torque of the steering wheel;
   a fixing pin that fixes one end of the torsion shaft to the input shaft so that the torsion shaft is not rotatable relative to the input shaft;
   a housing having a first housing portion that houses the pinion shaft together with parts of the input shaft and the torsion shaft, and a second housing portion that houses the steering operation shaft; and
   a cover member having a cylindrical portion externally fitted to the input shaft protruding from the first housing portion, and a disc portion that covers an open end face of the first housing portion, wherein
   the torsion shaft is fixed to the input shaft so as not to be rotatable relative to the input shaft by fitting the one end of the torsion shaft to a fitting hole formed in the input shaft and inserting the fixing pin into a through hole formed in each of the input shaft and the torsion shaft,
   the through hole of the input shaft is open in an outer peripheral surface covered with the cylindrical portion of the cover member,
   a plurality of annular lips are provided on an inner peripheral surface of the cylindrical portion of the cover member, the plurality of annular lips extending in a circumferential direction while ridges of the annular lips are brought into elastic contact with the outer peripheral surface of the input shaft, and
   the plurality of annular lips are provided, except for a portion that faces each of openings of the through hole of the input shaft, on one side and the other side in an axial direction of the input shaft with respect to the portion that faces each of the openings of the through hole of the input shaft.

2. The steering system according to claim 1, wherein an axial end face of the cylindrical portion of the cover member, which is provided in a position opposite to the first housing portion, has a non-water stagnating shape in which a radially inner end of the axial end face is not recessed toward the first housing portion with respect to the axial direction of the input shaft.

3. The steering system according to claim 1, wherein a radially inner end of an axial end face of the cylindrical portion of the cover member, which is provided in the position opposite to the first housing portion, has an inclined face that is inclined away from the first housing portion.

4. The steering system according to claim 3, wherein a radially outer end of the axial end face of the cylindrical portion of the cover member is a flat face perpendicular to the axial direction of the input shaft.

5. The steering system according to claim 1, wherein
   a lip-less area where no annular lip is provided is formed between the annular lip provided on the one side in the axial direction of the input shaft with respect to the portion that faces each of the openings of the through hole of the input shaft and the annular lip provided on the other side in the axial direction of the input shaft with respect to the portion that faces each of the openings of the through hole of the input shaft, and
   in the lip-less area, a clearance is formed between the inner peripheral surface of the cylindrical portion of the cover member and the outer peripheral surface of the input shaft.

* * * * *